(12) United States Patent
Elazouni et al.

(10) Patent No.: US 8,260,648 B2
(45) Date of Patent: Sep. 4, 2012

(54) PROCESS SCHEDULING OPTIMIZATION METHOD

(75) Inventors: Ashraf M. A. Elazouni, Dhahran (SA); Osama Abdel-Wahhab, Hail (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 437 days.

(21) Appl. No.: 12/585,237

(22) Filed: Sep. 9, 2009

(65) Prior Publication Data

US 2011/0060624 A1    Mar. 10, 2011

(51) Int. Cl.
*G06Q 10/00* (2006.01)
(52) U.S. Cl. ............ 705/7.13; 705/7.11; 705/7.12; 705/7.16; 705/7.22; 705/7.23
(58) Field of Classification Search ............... None
See application file for complete search history.

(56) References Cited

U.S. PATENT DOCUMENTS

| | | | |
|---|---|---|---|
| 4,019,027 A | 4/1977 | Kelley | |
| 4,803,039 A | 2/1989 | Impink, Jr. et al. | |
| 4,937,743 A | 6/1990 | Rassman et al. | |
| 5,432,887 A * | 7/1995 | Khaw | 706/19 |
| 5,442,730 A * | 8/1995 | Bigus | 706/19 |
| 5,704,012 A * | 12/1997 | Bigus | 706/19 |
| 5,715,371 A | 2/1998 | Ahamed et al. | |
| 5,745,652 A * | 4/1998 | Bigus | 706/14 |
| 5,918,219 A | 6/1999 | Isherwood | |
| 6,055,551 A | 4/2000 | Heinlein et al. | |
| 6,493,693 B1 | 12/2002 | Hill | |
| 6,578,005 B1 * | 6/2003 | Lesaint et al. | 705/7.14 |
| 6,606,527 B2 * | 8/2003 | de Andrade et al. | 700/97 |
| 6,609,100 B2 * | 8/2003 | Smith et al. | 705/7.26 |
| 6,631,384 B1 | 10/2003 | Richman et al. | |
| 6,633,782 B1 | 10/2003 | Schleiss et al. | |
| 6,842,760 B1 | 1/2005 | Dorgan et al. | |
| 7,003,475 B1 * | 2/2006 | Friedland et al. | 705/7.13 |
| 7,904,192 B2 * | 3/2011 | Chua et al. | 700/100 |

(Continued)

FOREIGN PATENT DOCUMENTS

| | | |
|---|---|---|
| JP | 2002132859 A | 5/2002 |
| WO | WO2008021259 A3 | 2/2008 |

OTHER PUBLICATIONS

Lu M and Li H (2003). Resource-Activity Critical-Path Method for Construction Planning. Journal of Construction Engineering and Management. July/August: 412-420.*

(Continued)

*Primary Examiner* — Lynda Jasmin
*Assistant Examiner* — Brett Feeney
(74) *Attorney, Agent, or Firm* — Richard C. Litman

(57) ABSTRACT

The design and process scheduling optimization method is a technique that circumvents problems encountered in previous optimization techniques. The method performs comparison against multiple possible outcomes rather than a single-valued benchmark. Pattern Recognition (PR) techniques are utilized to classify the work planned at specified cut-off dates during the planning stage. Classification is used to monitor and evaluate the progress during the construction stage. The PR technique generalizes a virtual benchmark to represent the whole project based on multiple possible outcomes generated at a given cut-off date. The generalization feature offers a potential tool to overcome the problem of variation in the quality of data collected. Patterns are constructed to encode work of the project at different cut-off dates. The present invention utilizes a robust pattern recognition method applied to Critical Path Method (CPM) procedures to monitor and evaluate progress of construction projects.

8 Claims, 3 Drawing Sheets

U.S. PATENT DOCUMENTS

| | | | |
|---|---|---|---|
| 2001/0032062 | A1 | 10/2001 | Plaskoff et al. |
| 2003/0105597 | A1* | 6/2003 | Tsui et al. .................... 702/20 |
| 2005/0154625 | A1* | 7/2005 | Chua et al. .................... 705/7 |
| 2006/0080279 | A1 | 4/2006 | Jones |
| 2006/0277487 | A1 | 12/2006 | Poulsen et al. |
| 2008/0126025 | A1 | 5/2008 | Seppanen et al. |
| 2008/0147580 | A1* | 6/2008 | Pannese .................... 706/33 |
| 2009/0106178 | A1* | 4/2009 | Chu .................... 706/14 |
| 2010/0115523 | A1* | 5/2010 | Kuschel .................... 718/103 |

OTHER PUBLICATIONS

Colak S, Agarwal A and Erenguc SS (2006). Resource Constrained Project Scheduling: a Hybrid Neural Approach. Perspectives in Modern Project Scheduling. International Series in Operations Research & Management Science. 92: 297-318.*

Tang L, Liu W, Liu J (2005). A neural network model and algorithm for the hybrid flow shop scheduling problem in a dynamic environment. Journal of Intelligent Manufacturing. 16: 361-370.*

Ling AH, Leung HF, Lam HK, Lee YS and Tam PKS (2003). Novel GA-Based Neural Network for Short-Term Load Forecasting. IEEE Transactions on Industrial Electronics. 50(4): 793-799.*

Hansen LK and Salamon P (1990). Neural Network Ensemble. IEEE Transactions on Pattern Analysis and Machine Intelligence. 12(IO): 993-1001.*

Sabuncuoglu I and Gurgun B (1996). A neural network model for scheduling problems. European Journal of Operational Research. 93:288-299.*

* cited by examiner

PROCESS SCHEDULING OPTIMIZATION METHOD

BACKGROUND OF THE INVENTION

1. Field of the Invention

The present invention relates to optimization procedures, and, more specifically to a design and process scheduling optimization method.

2. Description of the Related Art

Time management is a basic function of the system of construction project management. Time management constitutes project planning and project control. A project plan is devised to provide time guidance for the expeditious accomplishment of the project. During the construction phase of the project, project management controls site operations by establishing a progress monitoring and information feedback procedures.

Current practices of progress monitoring and evaluation involve the use of the superintendent's daily site reports and the project manager's monthly progress reports to describe the quantities of completed activities. Project monitoring involves the determination of work quantities put into place and the feedback of this information in a format suitable for direct comparison with the plan. Project monitoring is performed at regular intervals and at a predetermined cut-off dates. Based on the fed back data, the whole situation of the project is analyzed and consequently corrective actions are suggested to expedite lagging activities.

The traditional monitoring practice involves collecting actual quantity data, and comparing against a benchmark, which represents the relevant planned data. The encountered well-known problem in monitoring is that the quality of the collected data is often subjected to great variation due to the variation in the reporting skills as well as the willingness to record data accurately.

Thus, a design and process scheduling optimization method solving the aforementioned problems is desired.

SUMMARY OF THE INVENTION

The design and process scheduling optimization method is a technique that circumvents problems encountered in previous optimization techniques. The method conducts comparisons against multiple possible outcomes rather than a single-valued benchmark. The design and process scheduling optimization method utilizes Pattern Recognition (PR) techniques to classify work planned at specified cut-off dates during the planning stage. The classification is then used to monitor and evaluate progress during the construction stage.

The PR technique generalizes a virtual benchmark to represent the whole project based on multiple possible outcomes generated at a given cut-off date.

The generalization feature offers a potential tool to overcome the problem of variation in the quality of data collected. Patterns are constructed to encode work of the project at different cut-off dates.

The present invention utilizes a robust pattern recognition method applied to Critical Path Method (CPM) procedures to monitor and evaluate progress of construction projects.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
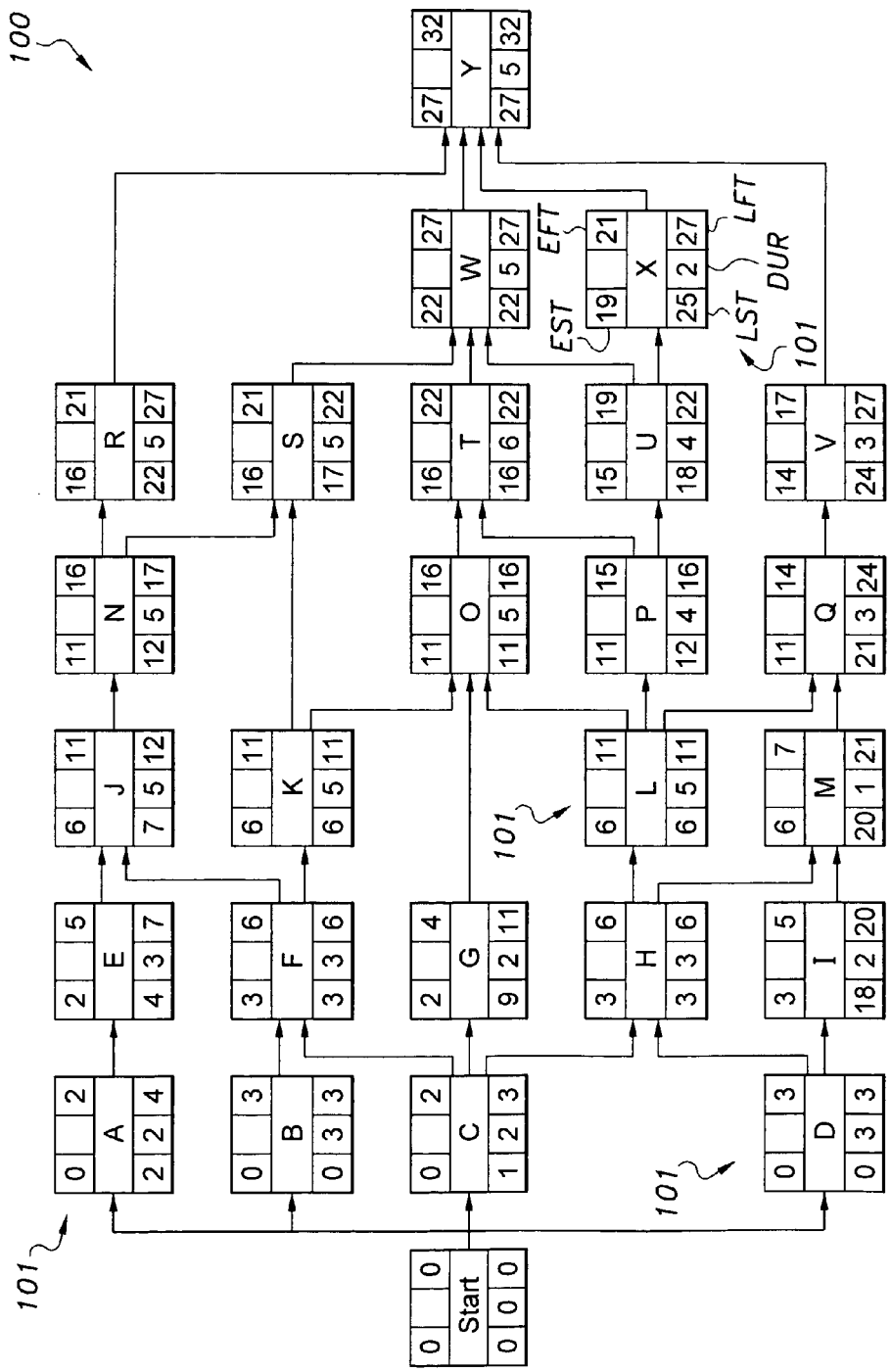
FIG. 1 is a block diagram of an exemplary CPM network according to the present invention.

The design and process scheduling optimization method utilizes Pattern Recognition (PR) techniques to classify the work planned at specified cut-off dates during the planning stage and uses the classification to monitor and evaluate the progress during the construction stage.

The PR technique of the design and process scheduling optimization method generalizes a virtual benchmark to represent the whole project based on multiple possible outcomes generated at a given cut-off date.

The generalization feature offers a potential tool to overcome the problem of variation in the quality of data collected. Patterns are constructed to encode work of the project at different cut-off dates.

The design and process scheduling optimization method utilizes a robust pattern recognition technique applied to Critical Path Method (CPM) procedures to monitor and evaluate progress of construction projects.

According to the design and process scheduling optimization method patterns are designed and constructed and then mapped to CPM schedules to describe the work planned during the planning stage as well as the work accomplished during construction stage. Patterns lend themselves well for manipulation by computer programs. Neural network pattern recognition techniques are employed to classify the work planned at the predetermined cut-off dates during the planning stage using multiple possible patterns. The week that corresponds to the input patterns which represents the actual work accomplishments at given cut-off dates during the construction stage is recognized.

During the planning phase of a project, cut-off dates separating periods at which the project will be regularly monitored during construction are specified. Normally, a monitoring period, typically a week, is determined when there is a need to describe a new stage of the project marked by the addition of an appreciable amount of work relative to the previous monitoring period. Patterns are designed and used to describe the work accomplishments of the particular project. A pattern is basically a matrix with appropriate numbers of rows and columns that can be used conveniently to map the CPM schedule of the project. The project work accomplishments at any time can be represented by filling in the appropriate cells of the schemes with 0-1 entries. As time goes on, the number of cells with entries of ones increases to indicate the extra work.

During the planning stage of the project, a number of patterns are generated for the project by assigning different start times of the project activities. The start times are selected randomly within the range of the early and late start times, taking sequence of the activities in consideration. Then, the completed patterns are curtailed at the cut-off dates to produce as many patterns as the number of the cut-off dates. The variation between the generated patterns at a given cut-off date is basically due to the selected values of the start times. The set of patterns at a given cut-off date represent possible outcomes of the actual accomplishment at this particular cut-off date. The sets of patterns at all the cut-off dates along with the corresponding weeks constitute the input patterns to a neural network pattern recognition model (NN). Some of the generated patterns are used for training the NN and the remaining patterns are kept for testing the trained NN.

During the construction stage of the project, the project monitoring is pursued regularly at the same cut-off dates specified during the planning stage. At any desired cut-off date, a pattern is prepared to describe the actual work accomplishments. This involves determining the actual start times of activities and measuring the work accomplishments already put into place up to the cut-off date. This pattern, which represents the status of the project at the particular cut-off date, is introduced as an input pattern to the trained NN model. The trained NN model will declare the week that this input pattern tends to converge to its patterns. Comparing the date of the declared week to the cut-off date of the input pattern will indicate whether the actual progress is ahead or behind. Thus, the pattern recognition technique automatically implements the task of project monitoring and evaluation.

Figure 2:
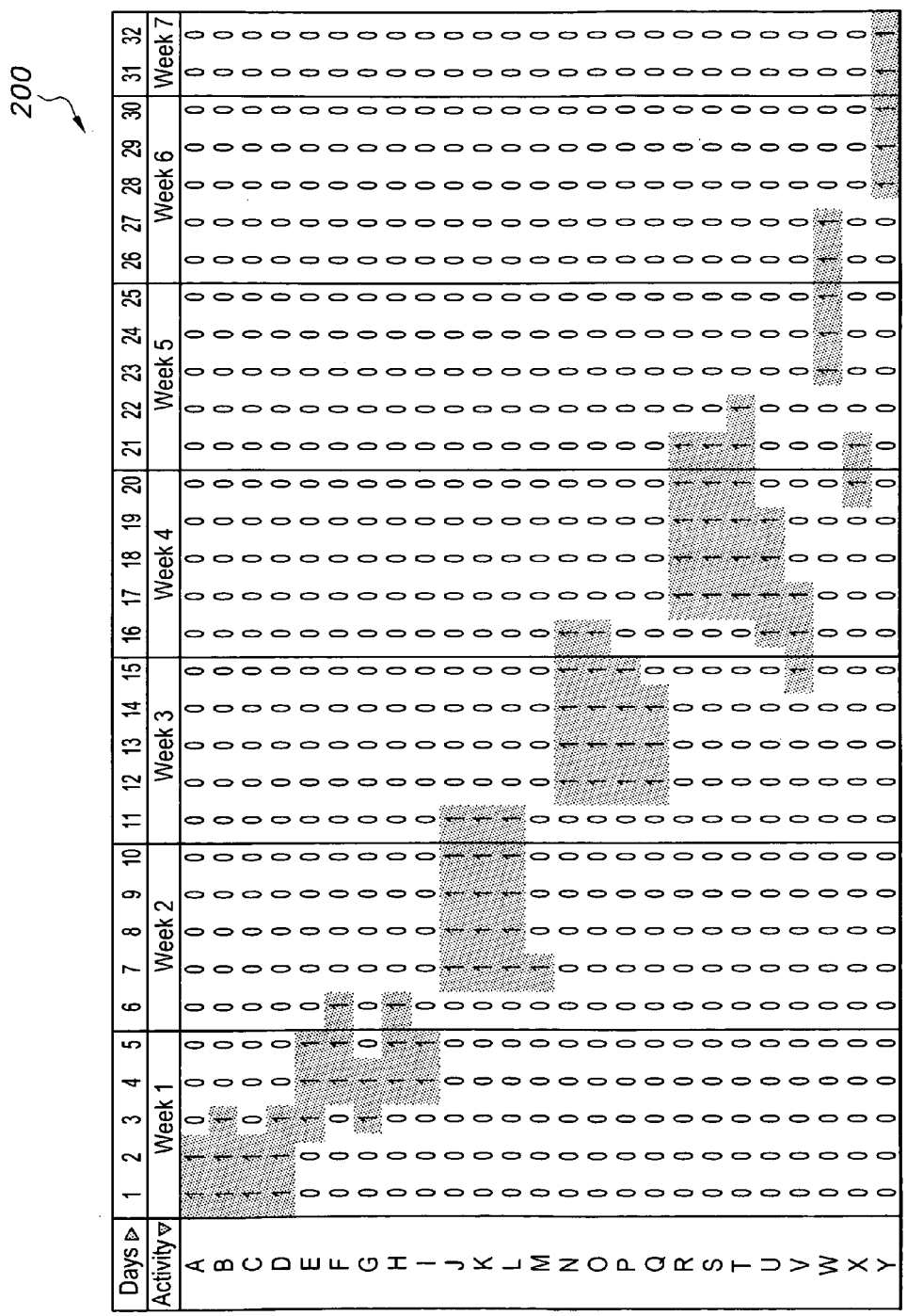
FIG. 2 is a tabular diagram representing a pattern of the exemplary CPM network, according to the present invention.

As shown in FIGS. 1 and 2, the CPM network 100 and the corresponding pattern exemplify a project having 25 activities. The tasks are labeled A through Y. Each CPM network box 101 is labeled with an earliest possible start for activity EST, an earliest possible finish for activity EFT, a latest possible start for activity LST, an activity duration DUR, and a latest possible finish for activity LFT. As most clearly shown in FIG. 2, the pattern is basically a 25 row by 32 column matrix 200 indicating the number of activities and working days respectively. The appropriate cells of the matrix are filled in with 'one' entries, knowing the start times and activity durations. The remaining cells of the matrix are filled in with "zero" entries. Thus, the matrix filled with the combination of zero and one entries as shown in FIG. 2 constitutes a pattern that represents the CPM schedule of the whole project and can be manipulated by computer programs. The cut-off dates delineating 5-day intervals are indicated in heavy vertical lines in FIG. 2. Patterns at a selected cut-off date can be easily produced by curtailing the patterns to the right of the selected pattern.

Figure 3:
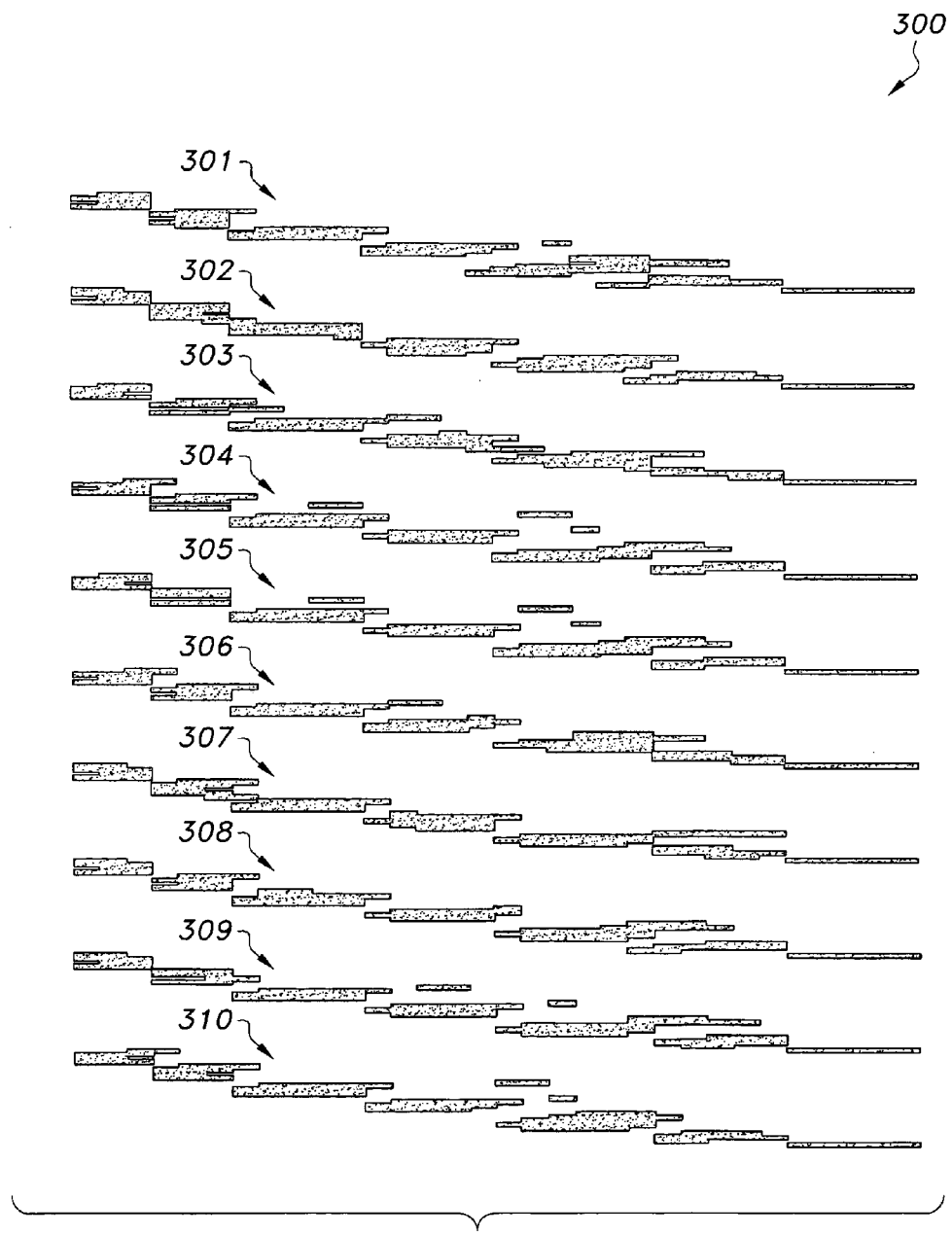
FIG. 3 is a diagram representing 10 additional patterns of the exemplary project, according to the present invention.

Similarly, additional patterns can be constructed at each cut-off date. The patterns are generated by randomly assigning values to the activities' start times within the range of the early start EST (see FIG. 1) and late start LST (see FIG. 1) values, while maintaining the sequence of activities. FIG. 3 shows a group 300 of ten additional patterns 301-310 of the CPM network at 32 days with shaded areas indicating cells with entries of "ones". Confining the start times of activities to a value between the early and late start times ensures that these patterns represent multiple possible patterns which will lead to the same project duration. Thus, the variation between the generated patterns at a given cut-off date is basically due to the variation of the start times of the activities. Ten patterns at a given cut-off date can be produced by curtailing the right-hand side of the patterns. The sets of random patterns at all the specified cut-off dates along with the corresponding weeks constitute the input to feed to the NN pattern recognition model.

The set of data for training and testing the NN patterns constitutes 7 cut-off dates, each having 10 random patterns, yielding a total of 70 patterns representing the input patterns. Associated with each input pattern there exists an output pattern of a vector of 7 entries indicating entry of "one" for the cut-off date of the pattern and "zero" for the entries of the other 6 weeks. The input pattern to the NN is a vector 800 elements representing entries of 32 columns and 25 rows and the output represents a vector of seven elements of the project cut-off dates.

As is well known by persons having ordinary skill in the art, a feed-forward neural network (NN) has a plurality of neurons arranged in groups comprising an input layer having its outputs serving as inputs to a first of at least one hidden layer, the last of the hidden layers serving as inputs to an output layer. The NN was configured by changing the number of hidden layers and the number of neurons in each hidden layer. For the design and process scheduling optimization method it was observed that the best performance was obtained at a configuration of one hidden layer containing ten neurons. The NN was trained on pattern groups 1 to 7. The 7 training data were split further into two pattern groups, the first 5 pattern groups and the remaining 2 pattern groups. The individual patterns of the 5 pattern groups were used for updating the network weights and biases and were entered randomly to the neural network. The remaining 2 pattern groups were used for validation purpose. The validation process is a stopping criterion such that when the recognition error increases, the training session is stopped, and the weights and biases at the minimum value of error are returned. This method, which is called cross validation, gives the ability to monitor the generalization performance of the network and prevent the network from over-fitting the training data.

The trained NN was tested using pattern groups 8 to 10 which were not introduced to the NN during the training session. When a particular test pattern is entered to the trained network, the recognized cut-off date is the one exhibiting the highest output among the seven cut-off dates. The results are presented in Table 1, which indicates that the patterns of pattern groups 8 through 10 were all recognized correctly. Generally, the NN could correctly recognize 21 members out of 21 with absolutely no recognition error. This result indicates that the proposed PR approach proved its effectiveness as a progress monitoring and evaluation technique for construction projects.

TABLE I

| Pattern Recognitions | | | |
| --- | --- | --- | --- |
| Cutoff Date | Pattern 8 | Pattern 9 | Pattern 10 |
| 1 | 1 | 1 | 1 |
| 2 | 2 | 2 | 2 |
| 3 | 3 | 3 | 3 |
| 4 | 4 | 4 | 4 |
| 5 | 5 | 5 | 5 |
| 6 | 6 | 6 | 6 |
| 7 | 7 | 7 | 7 |

The collection of actual data in construction sites is prone to high degree of imprecision. The issue of detection in the field contains a large extent of uncertainty and inconsistency. This problem is due to the considerable variance in levels of education and experience as well as attitudes toward recording daily site information by field personnel. Personnel responsible for recording daily site information range from experienced and educated engineers who are willing to accurately document work progress and productivity to inexperienced and uneducated personnel who struggle hard to document daily site information. Typically, the attitude of personnel is either to align themselves with the field or the office. Those who are pro-field personnel tend to avoid paperwork. In addition, the detection of work progress by general contractor's personnel can be biased against the subcontractors.

Another problematic attitude of field personnel is to conceal the slow progress of some activities to appear in good shape. Knowing that the actual data will be compared directly against planned data on an activity-by-activity basis, the personnel reporting actual progress tends to covert the bad performance of stumbling activities by generously reporting the actual progress. They speculate that the problems are not really serious and some remedial actions upon putting in action will definitely speed up progress and produce better results by the subsequent cut-off date. Another reason to conceal slow progress is that being evaluated on an activity-by-activity basis and not on the holistic project performance, the bad performance of stumbling activities will camouflage the outstanding performance they accomplished in some other activities. All these problems result in a great deal of variation in the quality of information collected in the field.

The process of traditional monitoring which compares the actual collected data of individual activities against single-valued benchmarks often results in great variation in the quality of data collected due to reporting skills as well as willingness to record accurately. The generalization feature that the NN brings about offers a potential environment to overcome this problem. The PR technique generalizes a virtual benchmark to represent the whole project based on multiple possible outcomes generated at each cut-off date. The merits that the generalized benchmark offers include: The effect of the imprecision in data collection, which happens due to either the lack of experience or the nature of the work which makes it difficult to figure out the accurate amount of completed work, on the evaluation of the status of activities and the whole project is significantly diminished; The impetus for personnel to inaccurately report data on-purpose is entirely negated as actual progress is being evaluated against a virtual benchmark; A fair overall evaluation of the project considering both slow-progressed and well-progressed activities is presented to the field personnel while keeping the single-valued benchmarks of the individual activities exclusively to project managers to analyze situations and make decisions.

The method may be implemented by one or more computers that have been programmed in software to perform the calculations required by the method. The computer may be any computing device, e.g., a personal computer. The computer may have a display for displaying a user interface. A processor (i.e., a central processing unit or microprocessor) executes computer program or software instructions loaded into an area of main memory. The program or software may be stored in RAM or ROM memory. The display, the processor, main memory, and RAM or ROM memory are connected by a data bus. The software may be stored on any computer readable media, including magnetic media (a hard disk drive, a floppy disk, a magnetic tape, etc.), an optical disk (a DVD, DVD-RAM, CD-ROM, CD-R/RW, laser disk, etc.), a magneto-optical disk, or semiconductor memory (RAM or ROM).

It is to be understood that the present invention is not limited to the embodiment described above, but encompasses any and all embodiments within the scope of the following claims.

We claim:

1. A computer software product that includes a non-transitory storage medium readable by a processor, the non-transitory storage medium having stored thereon a set of instructions for performing design and process monitoring optimization, the instructions comprising:

(a) a first set of instructions which, when loaded into main memory and executed by the processor, causes the processor to build a critical path method schedule of a project;

(b) a second set of instructions which, when loaded into main memory and executed by the processor, causes the processor to map, during a planning stage of said project, pattern sets of cut-off dates of said project to said critical path method schedule;

(c) a third set of instructions which, when loaded into main memory and executed by the processor, causes the processor to identify, during said planning stage, project cut-off date weeks corresponding to the pattern sets of the project cut-off dates;

(d) a fourth set of instructions which, when loaded into main memory and executed by the processor, causes the processor to input a portion of said pattern sets and the corresponding project cut-off date weeks into a neural network to train the neural network to perform pattern recognition in classifying work planned at specified cut-off dates;

(e) a fifth set of instructions which, when loaded into main memory and executed by the processor, causes the processor to use the remaining pattern sets to test the neural network pattern recognition after it has been trained;

(f) a sixth set of instructions which, when loaded into main memory and executed by the processor, causes the processor to monitor the project, during the construction stage of said project, at said same cut-off dates;

(g) a seventh set of instructions which, when loaded into main memory and executed by the processor, causes the processor to prepare, at any desired cut-off date, a corresponding descriptive pattern, said corresponding descriptive pattern describing actual work accomplishments during a time period defined by said any desired cut-off date;

(h) an eighth set of instructions which, when loaded into main memory and executed by the processor, causes the processor to input said descriptive pattern to said neural network which, responsively, declares a week of convergence that said descriptive pattern input tends to converge; and (i) a ninth set of instructions which, when loaded into main memory and executed by the processor, causes the processor to compare said week of convergence declared by said neural network pattern recognition to said cut-off date week of said associated cut-off date pattern set thereby indicating whether actual progress of the project is on schedule, ahead of schedule, or behind schedule.

2. The computer software product according to claim 1, wherein said neural network pattern recognition utilizes a single hidden layer.

3. The computer software product according to claim 2, wherein only ten neurons are utilized in said single hidden layer.

4. The computer software product according to claim 1, further comprising a tenth set of instructions which, when loaded into main memory and executed by the processor, causes the processor to benchmark the entire project based on multiple possible outcomes generated by said neural network pattern recognition at each said cut-off date.

5. The computer software product according to claim 1, further comprising an additional set of instructions which, when loaded into main memory and executed by the processor, causes the processor to associate an output pattern, said output pattern including a vector having a number of elements which equals the total number of project weeks, with each input pattern.

6. The computer software product according to claim 1, further comprising an additional set of instructions which, when loaded into main memory and executed by the processor, causes the processor to construct additional patterns at each cut-off date, said additional patterns being generated by randomly assigning values to the activities' start times within a range of an early start time (EST) and a late start time (LST), while maintaining a sequence of said activities, said additional patterns representing multiple possible patterns which will lead to the same project duration; and wherein sets of random patterns at all the specified cut-off dates along with their corresponding weeks constitute inputs to feed to the neural network.

7. The computer software product according to claim 1, wherein the training of the fourth set of instructions further comprises constructing a plurality of training pattern groups, each training pattern group of the plurality of training pattern groups being uniquely associated with each interval of the longest time period shown in the critical path method schedule, said training pattern groups being split further into a first number of sub-groups and a second number of sub-groups, individual patterns of the first number of sub-groups being used for updating said neural network weights and biases while being entered randomly to said neural network, said second number of sub-groups being used for a validating step.

8. The computer software product according to claim 7, further comprising an additional set of instructions which, when loaded into main memory and executed by the processor, causes the processor to validate said neural network pattern recognition, said validation including a stopping criterion such that when a pattern recognition error first begins to increase, the training session is stopped, and weights and biases of the neural network pattern recognition corresponding to a minimum pattern recognition error value are returned.

\* \* \* \* \*